United States Patent
Liedtke et al.

(10) Patent No.: US 9,091,211 B2
(45) Date of Patent: Jul. 28, 2015

(54) METHOD FOR OPERATING A GAS TURBINE

(75) Inventors: Klaus-Dieter Liedtke, Endingen (CH);
Mengbin Zhang, Otelfingen (CH);
Aysegul Kirecci, Baden (CH); Ulf Schirmeister, Endingen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 871 days.

(21) Appl. No.: 13/346,840

(22) Filed: Jan. 10, 2012

(65) Prior Publication Data
US 2012/0174592 A1 Jul. 12, 2012

(30) Foreign Application Priority Data
Jan. 11, 2011 (CH) .......................................... 41/11

(51) Int. Cl.
*F02C 9/28* (2006.01)
*F02C 9/26* (2006.01)
*F23R 3/28* (2006.01)

(52) U.S. Cl.
CPC . *F02C 9/263* (2013.01); *F02C 9/28* (2013.01); *F23R 3/28* (2013.01); *F05D 2270/091* (2013.01)

(58) Field of Classification Search
CPC .............. F02C 3/22; F02C 7/232; F02C 9/26; F02C 9/28; F02C 9/32; F02C 9/44; F02C 9/263; F05D 2260/96; F05D 2270/14; F05D 2270/05; F05D 2270/3015; F05D 2270/31; F05D 2270/332; F23R 3/28; F23R 2900/00014
See application file for complete search history.

(56) References Cited

U.S. PATENT DOCUMENTS

| 4,327,294 A * | 4/1982 | Smith et al. ................. 290/40 C |
| 7,047,747 B2 * | 5/2006 | Tanaka ........................... 60/773 |
| 7,549,293 B2 | 6/2009 | Gallagher et al. |
| 2003/0093184 A1 | 5/2003 | Tanaka |

FOREIGN PATENT DOCUMENTS

| EP | 0063999 A1 | 11/1982 |
| EP | 1310647 A1 | 5/2003 |

* cited by examiner

*Primary Examiner* — Andrew Nguyen
(74) *Attorney, Agent, or Firm* — Buchanan Ingersoll & Rooney PC

(57) ABSTRACT

A method for operating a gas turbine includes supplying fuel via at least one control valve regulated using an open-loop control system based on a predetermined load setpoint value. A valve stroke control command ($s_{cmd}$) is generated based on a fuel mass flow control command ($m_{cmd}$) using a mass flow-valve stroke converter. The valve stroke control command ($s_{cmd}$) is compared with a valve stroke limit value ($\min\{s_{lim1}, s_{lim2}\}$) using a variable pressure regulator. A load limit value is generated if the valve stroke control command ($s_{cmd}$) exceeds the valve stroke limit value ($\min\{s_{lim1}, s_{lim2}\}$) to reduce the load setpoint value. Operation of the gas turbine is stabilized using a low limit value ($x_{lim}$) of a pressure drop ratio (x), wherein the pressure drop ratio (x) is a quotient of a pressure drop (dp) which occurs at the control valve and of a pressure (p1) upstream of the control valve.

6 Claims, 2 Drawing Sheets

METHOD FOR OPERATING A GAS TURBINE

CROSS REFERENCE TO PRIOR APPLICATIONS

Priority is claimed to Swiss Application No. CH 00041/11, filed Jan. 11, 2011, the entire disclosure of which is incorporated by reference herein.

TECHNICAL FIELD

The present invention relates to the field of controlling gas turbines.

BACKGROUND

Shown in FIG. 1 is a simplified schematic arrangement of a gas turbine 10 which is operated with a gaseous fuel 16. The gas turbine 10 comprises a compressor 11 which draws in and compresses fresh air 14 and feeds the compressed air 15 to a combustion chamber 12 where it is used for combusting the gaseous fuel 16. The resulting hot gas 17 is expanded in a subsequent turbine 13, performing work, and is discharged as exhaust gas 18. The turbine 13 drives the compressor 11 and a generator 21 for generating electric power. The feed of the gaseous fuel 16 to the combustion chamber 12 is controlled and regulated by a control valve 19 which is connected to a control unit 20. An example of such controlling is described in EP 1 310 647.

Problems during operation of a gas turbine include vibrations in the control system of the gas turbine. There are various causes of such vibrations in the gas turbine control system. One of them is primarily caused by an excessively low pressure drop at the control valve 19 for the fuel gas feed.

A widely used means against a low gas pressure is the so-called variable-pressure operation in which the load of the gas turbine is reduced in order to lower the necessary gas pressure, specifically based either on (a) a fixed maximum control valve stroke limit value, or on (b) the compressor output pressure. Such a procedure is described in U.S. Pat. No. 7,549,293 B2, for example.

In order to maintain the necessary fuel mass flow, the control valve stroke is automatically increased as gas supply becomes lower. For this reason, monitoring of the control valve stroke (variant a) is a more accurate method for detecting a low gas pressure in comparison to monitoring of the compressor output pressure (variant b). The disadvantage of variant (a) is that a fixed maximum control valve stroke limit value has to be determined individually on the basis of the dimensions of the control valve.

The control valve stroke application is customarily designed so that all contractually agreed boundary conditions for the ambient temperature and the fuel gas composition are satisfied. However, it can be that the valve is oversized for certain boundary conditions. Such an oversized control valve can have a low pressure drop in such a way that the gas turbine control system becomes unstable.

Monitoring of the compressor output pressure according to variant (b) means a protection against an excessively low fuel gas supply pressure. The disadvantage of this variant, however, is that the protection is based on fixed variables which are calculated from accepted boundary conditions. These conditions must also cover the "worst case", which leads to a comparatively conservative protection and results in an avoidable reduction of the reliability of the machine.

If, therefore, variant (b) is replaced by variant (a), it must be ensured that the gas turbine can be operated in a stable manner, specifically independently of the dimensions of the control valve and independently of the ambient conditions.

SUMMARY OF THE INVENTION

In an embodiment, the invention provides a method for operating a gas turbine. The gas turbine includes a compressor for compressing air, a combustion chamber for combusting a gaseous fuel with the compressed air so as to form a hot gas and a turbine for expanding the hot gas. A supply of the gaseous fuel via at least one control valve is regulated using an open-loop control system based on a predetermined load setpoint value. A valve stroke control command ($s_{cmd}$) is generated based on a fuel mass flow control command ($m_{cmd}$) using a mass flow-valve stroke converter. The valve stroke control command ($s_{cmd}$) is compared with a valve stroke limit value ($\min\{s_{lim1}, s_{lim2}\}$) using a variable pressure regulator. A load limit value is generated if the valve stroke control command ($s_{cmd}$) exceeds the valve stroke limit value ($\min\{s_{lim1}, s_{lim2}\}$) so as to reduce the load setpoint value. Operation of the gas turbine is stabilized using a low limit value ($x_{lim}$) of a pressure drop ratio (x), wherein the pressure drop ratio (x) is a quotient of a pressure drop (dp) which occurs at the control valve and of a pressure (p1) upstream of the control valve.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
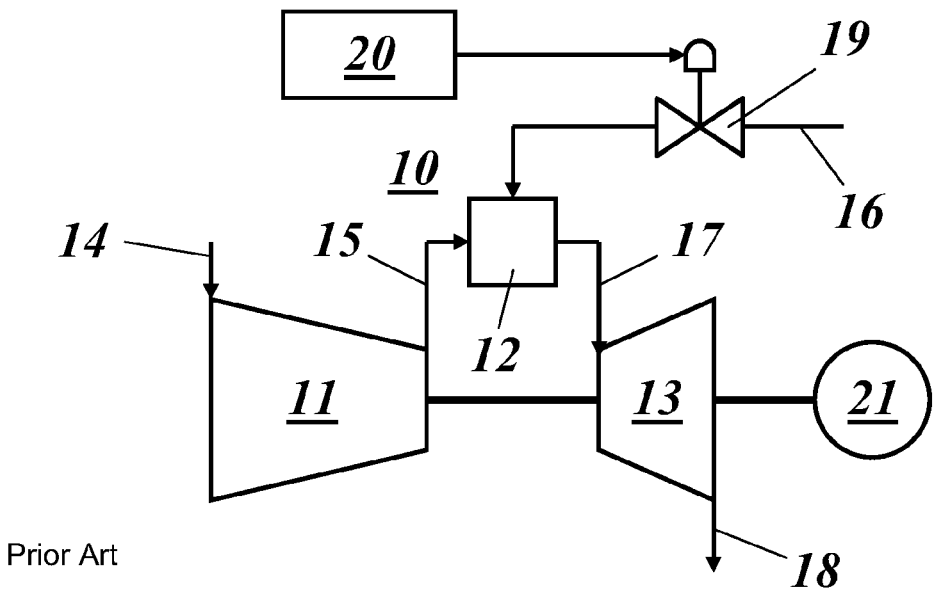
FIG. 1 shows a simplified schematic arrangement of a gas turbine plant, as is suitable for realizing the invention.

In an embodiment, a method is provided for operating a gas turbine to the effect that the disadvantages of the previous solutions are avoided and a stable operation over a broader range can be ensured in a simple manner.

In an embodiment of the method according to the invention for operating a gas turbine, which comprises a compressor for compressing fresh air, a combustion chamber for combusting a supplied gaseous fuel by means of the compressed air, and a turbine for expanding the hot gas which results during the combustion, the supply of the gaseous fuel is regulated via at least one control valve according to a predetermined load setpoint value by means of an open-loop control system in which by means of a variable-pressure regulator a valve stroke control command, which is generated from a fuel mass flow control command by a mass flow-valve stroke converter, is compared with a valve stroke limit value, and a load limit value is generated for reducing the load setpoint value if the valve stroke limit value is exceeded. For achieving a stable operation, a low limit value of the pressure drop ratio is used for the controlling or limiting, wherein the pressure drop ratio is the quotient of the pressure drop which occurs at the control valve and of the pressure upstream of the control valve.

In an embodiment of the method according to the invention, a first valve stroke limit value is fixedly predefined, in that a second valve stroke limit value with the low pressure drop ratio limit value is calculated in accordance with the equation $$s_{lim2} = f^{-1}(K_v) = f^{-1}\left(\frac{m_{cmd}}{N_1 \cdot F_p \cdot p1 \cdot Y \sqrt{\frac{x_s \cdot M}{Z \cdot T}}}\right),$$

wherein $m_{cmd}$ is a fuel mass flow control command to the control valve (19), $N_1$ is a constant, $F_p$ is a constant piping geometry factor, $f^{-1}(K_v)$ is a control valve characteristic, M is the fuel gas molecular weight, Z is a compressibility factor of the fuel gas and Y is an expansion factor according to the equation $$Y = 1 - \frac{x_s}{3F_r x_T},$$

wherein $x_s = F(x_{limp}, F_r x_T)$, and $$F_r = \frac{k_g}{k_a}$$

apply, with $k_g$ being the isentropic coefficient for the fuel gas and $k_a$ being the isentropic coefficient for air, and in that a valve stroke control command is compared with the minimum of the two valve stroke limit values.

$x_s = \min\{x_{lim}, F_r x_T\}$ is preferably used for calculation.

It is especially advantageous if, in an embodiment of the invention, $x_s = \min\{x, F_r x_T\}$, with $$x = \max\left\{\frac{dp}{p1}, x_{lim} - 0.01\right\},$$

is used for limiting the sensitivity of the mass flow-valve stroke conversion in relation to the pressure measurements.

In an embodiment, in particular, a value of the low pressure drop ratio limit value ($x_{lim}$) of between 0.09 and 0.11 is used.

In another embodiment of the method, a plurality of control valves are regulated, and in that the reduction of the load setpoint value starts as soon as the valve stroke limit value ($\min\{s_{lim1}, s_{lim2}\}$) in one of the control valves is exceeded.

Figure 2:
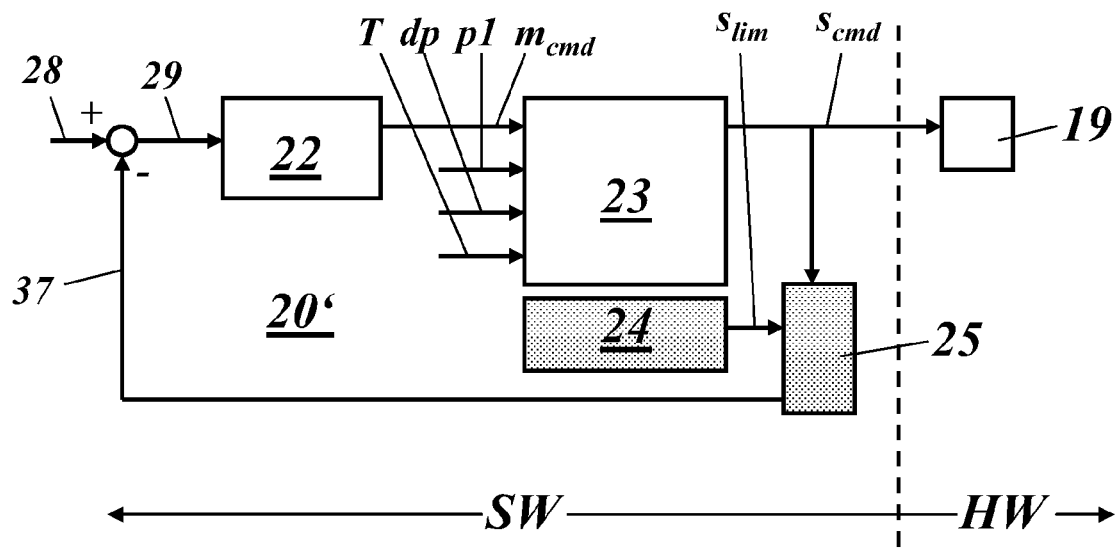
FIG. 2 shows a schematic arrangement for variable-pressure control of a gas turbine plant according to FIG. 1 with a software section SW and a hardware section HW.

A concept of variable-pressure control is reproduced in a simplified manner in FIG. 2. A principle of the depicted concept, which can be divided into a software section SW and a hardware section HW, is the limiting of the maximum possible control valve stroke during a load reduction of the gas turbine. The limit is a fixed stroke setpoint value at which the gas turbine begins with the load reduction. According to FIG. 2, in the open-loop control unit 20' a desired setpoint 28 for the load is given as a load control command 29 to the gas turbine governor 22. The gas turbine governor 22 gives the necessary fuel mass flow control command $m_{cmd}$ to a mass flow-valve stroke converter 23 which in its turn transmits a valve stroke control command $s_{cmd}$ to the control valve 19.

The fuel gas mass flow through the control valve 19 depends upon variable parameters, such as the gas pressure p1 upstream of the control valve 19, the pressure drop dp at the control valve 19, the fuel temperature T, and upon predefined constants such as the molecular mass M, the isentropic coefficient k, the characteristic f(stroke) and the parameters of the control valve 19, $F_p$ and $x_T$. The mass flow-valve stroke converter 23 converts the fuel mass flow control command $m_{cmd}$ into the valve stroke control command $s_{cmd}$.

The parts 24 and 25 which are highlighted in gray in FIG. 2 represent the basic variable-pressure concept in which by means of a variable-pressure regulator 25 the valve stroke control command $s_{cmd}$ is compared with a fixed valve stroke limit value $s_{lim}$ from the valve stroke limit value unit 24. If this fixed valve stroke limit value $s_{lim}$ is exceeded, a load limit value 37 is generated for reducing the load setpoint value 28. The load of the gas turbine is then reduced until the valve stroke control command $s_{cmd}$ again lies within the permitted range.

Figure 3:
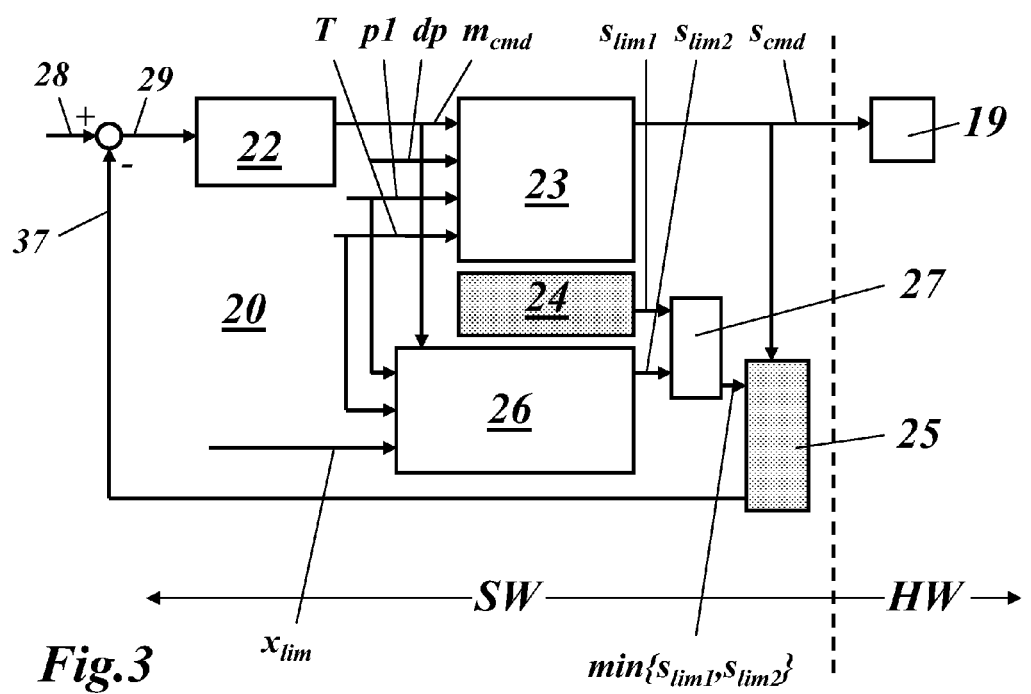
FIG. 3 shows in a view comparable to FIG. 2 a control schematic arrangement according to an exemplary embodiment of the invention.

Based on this configuration, instead of the one fixed valve stroke limit value $s_{lim}$ (see FIG. 2), the invention—according to the exemplary embodiment of the open-loop control system 20 shown in FIG. 3—now proposes to take, from this point on, the minimum $\min\{s_{lim1}, s_{lim2}\}$ of two limit values, specifically of the already known fixed valve stroke limit value $s_{lim}$, now referred to as $s_{lim1}$, and of a second valve stroke limit value $s_{lim2}$ which depends on the pressure drop ratio limit value $x_{lim}$, i.e. on the minimum of the ratio of the pressure drop at the control valve 19 and the pressure p1 upstream of the control valve 19, dp/p1.

The valve stroke control command $s_{cmd}$ is calculated from the mass flow-valve stroke converter 23 on the basis of the fuel mass flow control command $m_{cmd}$, the gas property and the characteristic values of the control valve 19. The valve stroke control command $s_{cmd}$ is produced as follows:

$$s_{cmd} = f^{-1}(K_v) = f^{-1}\left(\frac{m_{cmd}}{N_1 \cdot F_p \cdot p1 \cdot Y \sqrt{\frac{x_s \cdot M}{Z \cdot T}}}\right) \quad (1)$$

with $m_{cmd}$ being the fuel mass flow control command, wherein:
$N_1$=constant
$F_p$=piping geometry factor (constant)
$f^{-1}(K_v)$=control valve characteristic
M=fuel gas molecular weight
Z=compressibility factor of the fuel gas (varies with the gas mixture)
Y=expansion factor, which is defined as follows:

$$Y = 1 - \frac{x_s}{3F_r x_T} \text{ wherein:} \quad (2)$$

$$x_s = \min\{x, F_r x_T\} \quad (3)$$

$$x = \frac{dp}{p1} \text{ and} \quad (4)$$

$$F_r = \frac{k_g}{k_a} \quad (5)$$

with $k_g$ being the isentropic coefficient for the fuel gas and $k_a$ being the isentropic coefficient for air ($\approx 1.4$).

The critical pressure drop ratio at the control valve 19, $x_T$, is the pressure drop ratio x at which the blocked flow state is achieved if air is used as the medium. With a blocked flow, the mass flow through the control valve 19 no longer increases with the pressure drop dp across the control valve 19 if the conditions upstream remain the same. For a gaseous medium which differs from air, the blocked flow state is achieved if the pressure drop ratio x reaches or exceeds the pressure drop which is critical for the gas:

$$x \geq F_r x_T \quad (6)$$

If the pressure drop ratio x is small, the valve stroke control command $s_{cmd}$ becomes very sensitive with regard to the accuracy of the gas pressure measurement. It is observed that a reduction of the pressure drop ratio x results in an increase of the ratio between the measured fuel mass flow and the mass flow which is predetermined by means of the control command. A significant reduction in the stability range of control results from this. In order to ensure the necessary stability of control, the pressure drop ratio x must therefore be restricted by means of a low limit value. If the reduction of the stability range is to be no more than 20%, the pressure drop ratio x in the present case must not be less than 0.11.

The minimum pressure drop ratio $x_{lim}$ is considerably smaller, depending upon the size of the control valve 19. It is determined by means of the stability range of the closed control loop and can be determined by means of an online test of the stability limits by reducing the fuel gas supply pressure. For most applications, $x_{lim}$ can be established at a value of between 0.09 and 0.11.

For the combination with the fixed valve stroke limit value $s_{lim1}$, the minimum pressure drop ratio $x_{lim}$ must be converted in a second mass flow-valve stroke converter 26 (FIG. 3) into a permissible valve stroke limit value $s_{lim2}$:

$$s_{lim2} = f^{-1}(K_v) = f^{-1}\left(\frac{m_{cmd}}{N_1 \cdot F_p \cdot p1 \cdot Y \sqrt{\frac{x_s \cdot M}{Z \cdot T}}}\right), \quad (7)$$

wherein $x_{lim}$ is used instead of x for calculating the variables Y and $x_s$.

The maximum stroke for initiating the variable-pressure operation is:

$$s_{cmd} = \min\{s_{lim1}, s_{lim2}\}. \quad (8)$$

It is determined by means of a minimum transformer 27 (FIG. 3), wherein the value $s_{lim1}$ is fixed and amounts to 90%, for example.

In order to limit the sensitivity of the mass flow-valve stroke conversion in relation to the accuracy of the pressure measurements, the pressure drop ratio x in the equation (3) must be limited as follows:

$$x = \max\left\{\frac{dp}{p1}, x_{lim} - 0.01\right\}. \quad (9)$$

If more than one control valve 19 is in operation, the variable-pressure operation is activated as soon as one of the valve stroke control commands reaches its limit value which is determined by the equation (8).

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

10 Gas turbine
11 Compressor
12 Combustion chamber
13 Turbine
14 Fresh air
15 Compressed air
16 Fuel (gaseous)
17 Hot gas
18 Exhaust gas
19 Control valve
20, 20' Open-loop control system
21 Generator
22 Gas turbine governor
23, 26 Mass flow-valve stroke converter
24 Valve stroke limit valve unit
25 Variable-pressure regulator
27 Minimum transformer
28 Setpoint value
29 Load control command (load CMD)
T Fuel temperature
p1 Pressure (upstream of the control valve)
dp Pressure drop (at the control valve)
$m_{cmd}$ Fuel mass flow control command
$\min\{s_{lim1}, s_{lim2}\}$ Minimum of valve stroke limit values $s_{lim1}$, $s_{lim2}$
$s_{lim1}, s_{lim2}$ Valve stroke limit value (fixed)
$s_{lim2}$ Valve stroke limit value (depending upon dp/p1)
$s_{cmd}$ Valve stroke control command
$x_{lim}$ Pressure drop ratio limit value
37 Load limit value
SW Software
HW Hardware

What is claimed is:

1. A method for operating a gas turbine, the gas turbine including a compressor for compressing air, a combustion chamber for combusting a gaseous fuel with the compressed air so as to form a hot gas and a turbine for expanding the hot gas, the method comprising:
   regulating a supply of the gaseous fuel based on a predetermined load setpoint value via at least one control valve using an open-loop control system, the regulating including:
   generating a valve stroke control command ($S_{cmd}$) based on a fuel mass flow control command ($m_{cmd}$) using a mass flow-valve stroke converter;
   comparing the valve stroke control command ($S_{cmd}$) with a valve stroke limit value ($\min\{s_{lim1}, s_{lim2}\}$) using a variable pressure regulator;
   generating a load limit value if the valve stroke control command ($S_{cmd}$) exceeds the valve stroke limit value ($\min\{s_{lim1}, s_{lim2}\}$) so as to reduce the load setpoint value; and
   stabilizing operation of the gas turbine by using a low limit value ($X_{lim}$) of a pressure drop ratio (x), wherein the pressure drop ratio (x) is a quotient of a pressure drop (dp) which occurs at the at least one control valve and of a pressure (p1) upstream of the at least one control valve.

2. The method as recited in claim 1, wherein the valve stroke limit value ($\min\{s_{lim1}, s_{lim2}\}$) is a minimum of a first valve stroke limit value and a second valve stroke limit value, the first valve stroke limit value ($s_{lim1}$) being predefined and the second valve stroke limit value ($s_{lim2}$) being calculated based on the low pressure drop ratio limit value ($x_{lim}$) using $$s_{lim2} = f^{-1}(K_v) = f^{-1}\left(\frac{m_{cmd}}{N_1 \cdot F_p \cdot p1 \cdot Y \sqrt{\frac{x_s \cdot M}{Z \cdot T}}}\right)$$

wherein $m_{cmd}$ is the fuel mass flow control command to the control valve, $N_1$ is a constant, $F_p$ is a constant piping geometry factor, $f^{-1}(K_v)$ is a control valve characteristic, M is the fuel gas molecular weight, Z is a compressibility factor of the fuel gas and Y is an expansion factor according to the equation $$Y = 1 - \frac{x_s}{3F_r x_T},$$

wherein $x_s = F(x_{lim}, F_r x_T)$, and $$F_r = \frac{k_g}{k_a}$$

apply, with $k_g$ being the isentropic coefficient for the gaseous fuel and $k_a$ being the isentropic coefficient for air.

3. The method as recited in claim 2, wherein $x_s = \min\{x_{lim}, F_r x_T\}$.

4. The method as recited in claim 2, wherein $x_s = \min\{x, F_r x_T\}$ and wherein $$x = \max\left\{\frac{dp}{p1}, x_{lim} - 0.01\right\}$$

so as to limit a sensitivity of the mass flow-valve stroke conversion relative to a pressure measurement.

5. The method as recited in claim 1, wherein a value of the low pressure drop ratio limit value ($x_{lim}$) is between 0.09 and 0.11.

6. The method as recited in claim 1, wherein the at least one control valve includes a plurality of control valves, and wherein the load setpoint value is reduced if the valve stroke control command ($s_{cmd}$) exceeds the valve stroke limit value ($\min\{s_{lim1}, s_{lim2}\}$) in one of the plurality of control valves.

\* \* \* \* \*